United States Patent
Dhandu et al.

(10) Patent No.: US 11,206,187 B2
(45) Date of Patent: Dec. 21, 2021

(54) METHOD AND APPARATUS FOR VIRTUAL FUNCTION SELF-ORGANISATION

(71) Applicant: Telefonaktiebolaget LM Ericsson (publ), Stockholm (SE)

(72) Inventors: Prudhvi Dhandu, Athlone (IE); Ciaran Johnston, Athlone (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 192 days.

(21) Appl. No.: 16/483,773

(22) PCT Filed: Mar. 9, 2017

(86) PCT No.: PCT/EP2017/055607
§ 371 (c)(1),
(2) Date: Aug. 6, 2019

(87) PCT Pub. No.: WO2018/149514
PCT Pub. Date: Aug. 23, 2018

(65) Prior Publication Data
US 2020/0028749 A1  Jan. 23, 2020

(30) Foreign Application Priority Data
Feb. 16, 2017 (WO) ............... PCT/EP2017/053572

(51) Int. Cl.
*G06F 15/173* (2006.01)
*H04L 12/24* (2006.01)
(Continued)

(52) U.S. Cl.
CPC ...... *H04L 41/0896* (2013.01); *G06F 9/45558* (2013.01); *H04L 12/4641* (2013.01);
(Continued)

(58) Field of Classification Search
None
See application file for complete search history.

(56) References Cited

U.S. PATENT DOCUMENTS 9,430,262 B1 * 8/2016 Felstaine ............... H04L 67/16
10,042,722 B1 * 8/2018 Chigurupati ........ G06F 11/1423
(Continued)

FOREIGN PATENT DOCUMENTS

| EP | 3013002 A1 | 4/2016 |
| WO | 2015126430 A1 | 8/2015 |
| WO | 2017020949 A1 | 2/2017 |

OTHER PUBLICATIONS

Unknown, Author, "Network Functions Virtualisation (NFV); Architectural Framework", ETSI GS NFV 002 V1.1.1, Oct. 2013, pp. 1-21.
(Continued)

*Primary Examiner* — Quang N Nguyen
(74) *Attorney, Agent, or Firm* — Murphy, Bilak & Homiller, PLLC

(57) ABSTRACT

A method for virtual function self-organisation in operation of a network service in a virtual network environment managed by a Network Functions Virtualisation Management and Orchestration, NFV MANO, system. The method comprises monitoring (502) processing load on a first service chain component. If a processing load change is detected (504) at the first service chain component the method comprises determining (508) impact of the processing load change on a second service chain component located downstream in said service chain; and notifying (512) the NFV MANO system about the impact the processing load change will have on the second service chain component in said service chain if (510) the processing load of the second service chain component is expected to cross a threshold.

19 Claims, 10 Drawing Sheets

(51) Int. Cl.
G06F 9/455 (2018.01)
H04L 12/46 (2006.01)
H04L 12/26 (2006.01)

(52) U.S. Cl.
CPC .......... *H04L 43/0876* (2013.01); *H04L 43/16* (2013.01); *G06F 2009/4557* (2013.01); *G06F 2009/45595* (2013.01); *G06F 2209/5022* (2013.01)

(56) References Cited

U.S. PATENT DOCUMENTS

| | | |
|---|---|---|
| 10,127,337 B1* | 11/2018 | Wang .................. C23C 18/1608 |
| 2015/0180730 A1 | 6/2015 | Felstaine et al. |
| 2016/0179582 A1 | 6/2016 | Skerry et al. |
| 2016/0344621 A1* | 11/2016 | Roeland .................. H04L 45/38 |
| 2017/0019335 A1* | 1/2017 | Schultz ............... H04L 47/2483 |
| 2017/0289307 A1* | 10/2017 | Thompson .............. G06F 9/505 |
| 2018/0063018 A1* | 3/2018 | Bosch .................... H04L 45/306 |
| 2019/0109762 A1* | 4/2019 | Andrianov .......... G06F 9/45558 |

OTHER PUBLICATIONS

Unknown, Author, "Network Functions Virtualisation (NFV); Management and Orchestration", ETSI GS NFV-MAN 001 V1.1.1, Dec. 2014, pp. 1-184.

* cited by examiner

METHOD AND APPARATUS FOR VIRTUAL FUNCTION SELF-ORGANISATION

TECHNICAL FIELD

The present invention relates to Network Functions Virtualisation, in general, and in particular to a method and apparatus for virtual function self-organisation in operation of a network service in a virtual network environment.

BACKGROUND

It is known to apply virtualization to network functions in communications networks. Benefits of such network function virtualization NFV derive partly from replacing silos of monolithic and proprietary, and therefore expensive, hardware service platforms in the communications infrastructure by abstracted services run as applications on an open and commodity, and therefore cheaper, compute, storage and network infrastructure. An example architectural framework is under development within the European Telecommunications Standards Institute, ETSI, known as NFV, and some features of this are summarized below with respect to FIG. 1. Network Function Virtualisation framework includes three main components: Virtualised Network Functions (VNFs), 106, Network Function Virtualisation Infrastructure (NFVI), 104, and Network Function Virtualisation Management and Orchestration system (NFV MANO), 102, as illustrated in FIG. 1. Virtualised Network Function (VNF) is a software implementation of network function that runs on NFVI, 104. Network Functions Virtualization Infrastructure (NFVI), 104 includes physical resources, 108, that will be virtualized to run VNFs, 106. NFV Management and Orchestration system (NFV MANO), 102, covers orchestration and life cycle management of physical resources, software resources, and VNFs. Network Service (NS) in NFV is an end-to-end VNF forwarding graph of network functions and end points/terminals as shown in FIG. 3. FIG. 1 illustrates the high-level NFV framework, and is a zoomed out and simplified version of the architectural framework of FIG. 2.

Telecoms networks currently contain a variety, which is tending to increase, of proprietary hardware appliances. Each network service may use a separate hardware appliance. Hardware lifecycles are becoming shorter, reducing the return on investment of deploying new services in an increasingly network-centric world. NFV is a new network operator-led Industry Specification Group, ISG, in ETSI to work through the technical challenges for Network Functions Virtualization. Network Functions Virtualization, NFV, aims to address these problems by evolving standard IT virtualization technology to consolidate many network equipment types onto industry standard high volume servers, switches and storage.

NFV involves implementing network functions in software that can run on a range of industry standard server hardware, and that can be moved to, or instantiated in, various locations in the network as required, without the need to install new equipment. NFV decouples software implementations of Network Functions from the compute, storage, and networking resources through a virtualization layer.

FIG. 2 shows a schematic view of other entities involved in an example of management of Virtualised Network Functions (VNFs) and their relationships with VNF Manager 203. The VNF Manager 203 is one part of an NFV Management and Operations system, NFV MANO, 102, and is responsible for VNF life-cycle management. Specifically, the VNF Management functions responsible for the VNF's lifecycle management include:
- instantiating VNF, i.e. create a VNF using the VNF on-boarding artefacts;
- VNF scaling, i.e. increasing or reducing the capacity of the VNF;
- updating and/or upgrading VNF;
- terminating VNF, this involves releasing VNF-associated NFVI resources and returning them to NFVI resource pool.

The VNF Manager, 203, can be configured to carry out allocation of instances of Virtualised Network Function Components, VNFCs, to hosts. The allocation may be prompted based on a request received from an OSS/BSS 205, or from another part of the NFV MANO system, 102. The OSS/BSS can be a conventional operational support system and business support system. The function of the NFV MANO system is governing service orchestration, automation and administration. It can have access to stored descriptions of services (also known as descriptors), of VNFs, and of infrastructure. In this case the entities are based on the published ETSI standard: Network Functions Virtualisation (NFV) Management and Orchestration; ETSI GS NFV-MAN 001 V1.1.1 (2014-12). Coupled to the OSS/BSS, 205, there is an Element Management System, EMS, 206. This manages elements used in carrying the traffic across the network and makes use of a number of Virtualised Network Functions 106. The Virtualised Network Functions (VNF) may make use of Network Functions Virtualization Infrastructure, NFVI, 104. The NFVI can have virtual compute parts, virtual storage parts and virtual network parts and a virtualization layer, on physical computer hardware, physical storage hardware and physical network hardware. The NFV MANO system 102 further comprises an NFV Orchestrator, NFVO, 202, one or more VNF Managers 203 and a Virtualized Infrastructure Manager, VIM, 204 coupled to the VNF Manager, 203.

There is an interface called reference point Ve-Vn in-em between on the one side the EMS 206 and the VNF, 203, and Ve-Vnfm-vnf between VNF, 106, and VNFM, 203 on the other side. An interface called reference point Or-Vi is provided between the NFV Orchestrator 202 and VIM 204. An execution reference point Vn-Nf is shown between the VNF 106 and the NFVI 104. An interface called reference point Or-Vnfm is provided between the NFV Orchestrator 202 and VNF Manager 203. An interface called reference point Vnfm-Vi is provided between the VIM 204 and the VNF Manager 203. These interfaces and the functions of the different entities follow the arrangement known from the ETSI NFV standard in this example.

The NS Catalogue, 2022, represents the repository of all of the on-boarded Network Services, the VNF Catalogue, 2024, represents the repository of all of the on-boarded VNF Packages, the NFV Instances, 2026, is a repository that holds information of all VNF instances and Network Service instances and the NFVI Resources, 2028, is a repository that holds information about available/reserved/allocated NFVI resources as abstracted by the VIM across operator's Infrastructure Domains.

By tightly coupling software with specific, proprietary hardware, network functions are deployed as proprietary physical appliances or network equipment such as, for example, eNodeB. Deploying and integrating these physical network functions is very complex and time consuming which increases OPEX and CAPEX expenditure. Also, because of ever increasing customer demand for higher bandwidth, telecom operators are constantly under pressure for faster deployment of new network functions. However, due to high manual effort required to install these physical network functions, rapid deployment is not possible.

To address these problems, the mentioned earlier decoupling of network function software from the underlying hardware is intended in Network Function Virtualization (NFV).

With NFV it is possible to have hardware and software separation to enable the software to evolve independently from the hardware, and vice versa and elastic scaling of the network by dynamic deployment of new network functions as and when required on generic hardware. As a result, operators can realize dynamic service chaining i.e. creating services dynamically using virtualized network functions and interconnecting them as required. In consequence a service chain comprises service chain components implemented as Virtualised Network Functions, VNFs.

Elastic scaling of the network by dynamically deploying new network functions as and when required is one of the key features of NFV. As and when required, commissioning of new virtual function instances might be straightforward, however, instantiation of new VNFs take at least a few seconds, and there are a number of network functions that have strict delay requirements. Under such circumstances latency of a few seconds is equal to service non-availability. This is not acceptable where traditional, purpose-built network equipment offers five-nines availability in telecommunications industry. When offering specific services, telecom operators need to guarantee that service reliability and service level agreement are not affected when evolving to NFV.

Some existing solutions are trying to address this problem. For example, patent application WO2015126430A1 proposes a solution in which performance level of one VNF is monitored and scale-out/scale-in decisions are taken based on the VNFC performance level.

This solution works when either service/traffic demand growth is steady or service offering is not time critical. But in telecommunication networks, frequent and sudden network service demand fluctuation are a norm. And more importantly, success or failure of many use cases are determined by how the inherent real-time requirements are met during the use case execution. These real-time requirements that ensure the performance of the radio access protocol are on a microsecond level and, in some cases, on a nanosecond level. Under such circumstances, reacting by creating new VNFs when a threshold value is reached is not sufficient.

SUMMARY

It is the object of the present invention to obviate at least some of the above disadvantages and provide an improved method and apparatus for virtual function self-organisation in operation of a network service in a virtual network environment.

Accordingly, the invention seeks to preferably mitigate, alleviate or eliminate one or more of the disadvantages mentioned above singly or in any combination.

According to a first aspect of the present invention there is provided a method for virtual function self-organisation in operation of a network service in a virtual network environment managed by a Network Functions Virtualisation Management and Orchestration, NFV MANO, system. The method comprises monitoring processing load on a first service chain component and if a processing load change is detected at the first service chain component the method comprises further operations. These operations include determining impact of the processing load change on a second service chain component located downstream in said service chain and notifying the NFV MANO system about the impact the processing load change will have on the second service chain component in said service chain if the processing load of the second service chain component is expected to cross a threshold.

According to a second aspect of the present invention there is provided an apparatus for virtual function self-organisation in operation of a network service in a virtual network environment managed by a Network Functions Virtualisation Management and Orchestration, NFV MANO, system. The apparatus comprises a processor and a memory. The memory contains instructions executable by the processor such that the apparatus is operative to monitor processing load on a first service chain component. If a processing load change is detected at the first service chain component the apparatus is operative to determine impact of the processing load change on a second service chain component located downstream in said service chain and notify the NFV MANO system about the impact the processing load change will have on the second service chain component in said service chain if the processing load of the second service chain component is expected to cross a threshold Further features of the present invention are as claimed in the dependent claims.

BRIEF DESCRIPTION OF THE DRAWINGS

The present invention will be understood and appreciated more fully from the following detailed description taken in conjunction with the drawings in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 3:
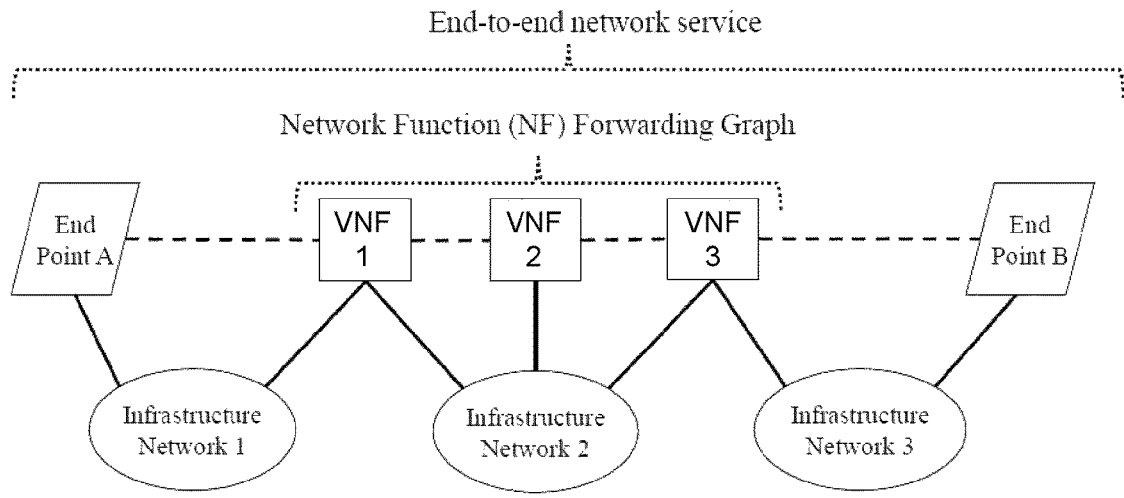
FIG. 3 is a graph representation of ETSI end-to-end network service.
Figure 4:
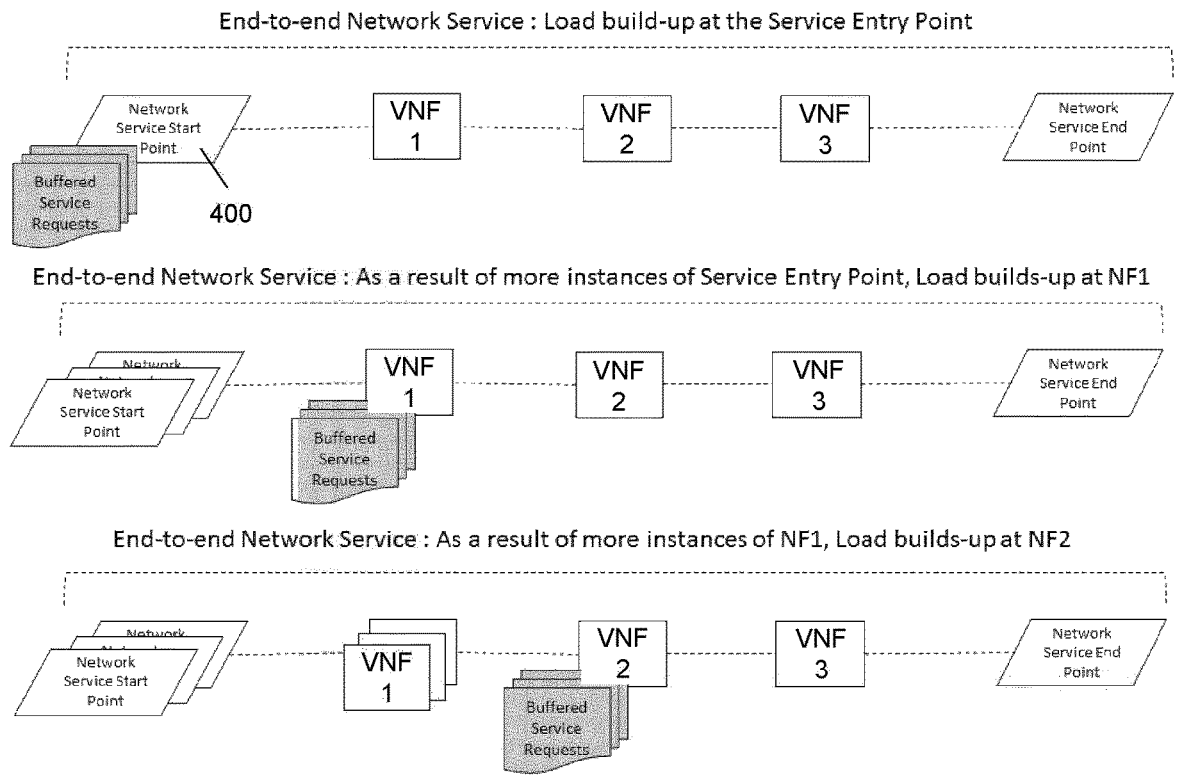
FIG. 4 is a diagram illustrating creation of instances of Virtualised Network Functions in a Network Service in response to performance degradation.

As mentioned earlier, and illustrated in FIG. 3, a network service in NFV is an end-to-end forwarding graph of network functions (implemented as Virtualised Network Functions) and end points (or terminals). When service congestion (or more general, performance degradation) is noticed at the service start point, new instances of service start point are created. This would likely cause service congestion at VNF1 and triggers new VNF1 instances creation. This, in turn, would likely cause congestion at VNF2 and triggers new VNF2 instances creation. This is schematically illustrated in FIG. 4. As illustrated, the problem propagates from one component to the other in the service chain and needs to be addressed at different components independently leading to more delay.

Figure 5:
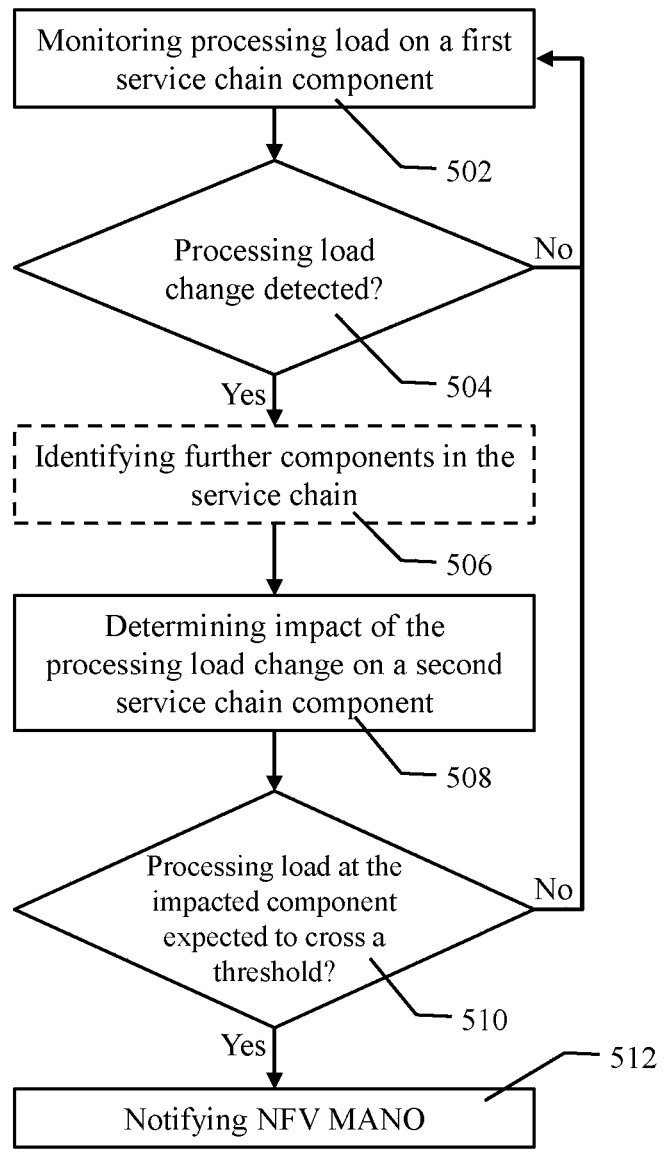
FIG. 5 is a diagram illustrating a method for virtual function self-organisation in operation of a network service in a virtual network environment managed by a NFV MANO system in one embodiment of the present invention.

With reference to FIG. 5 an embodiment of a method for virtual function self-organisation in operation of a network service in a virtual network environment is now to be described. The network service operates in a virtual network environment managed by a Network Functions Virtualisation Management and Orchestration, NFV MANO, system, 102. In a preferred embodiment the method comprises monitoring, 502, processing load on a first service chain component. If the monitoring detects, 504, a processing load change at the first service chain component the method comprises determining, 508, impact of the processing load change on a second service chain component located downstream in said service chain. If the processing load of the impacted second service chain component in the service chain is expected to cross a threshold, 510, the method further comprises notifying, 512, the NFV MANO system, 102, about the impact the processing load change will have on the second service chain component.

The NFV MANO system, 102, may take an action in response to the received notification, 512. The load change can be load increase or load decrease. As explained in description of embodiments given below in response to a load increase the NFV MANO system, 102 may create new instances of virtualised network functions whereas in response to a load decrease the NFV MANO system, 102 may close down instances of virtualised network functions.

The above method can be implemented in more than one alternative embodiment.

Distributed Implementation

Figure 6:
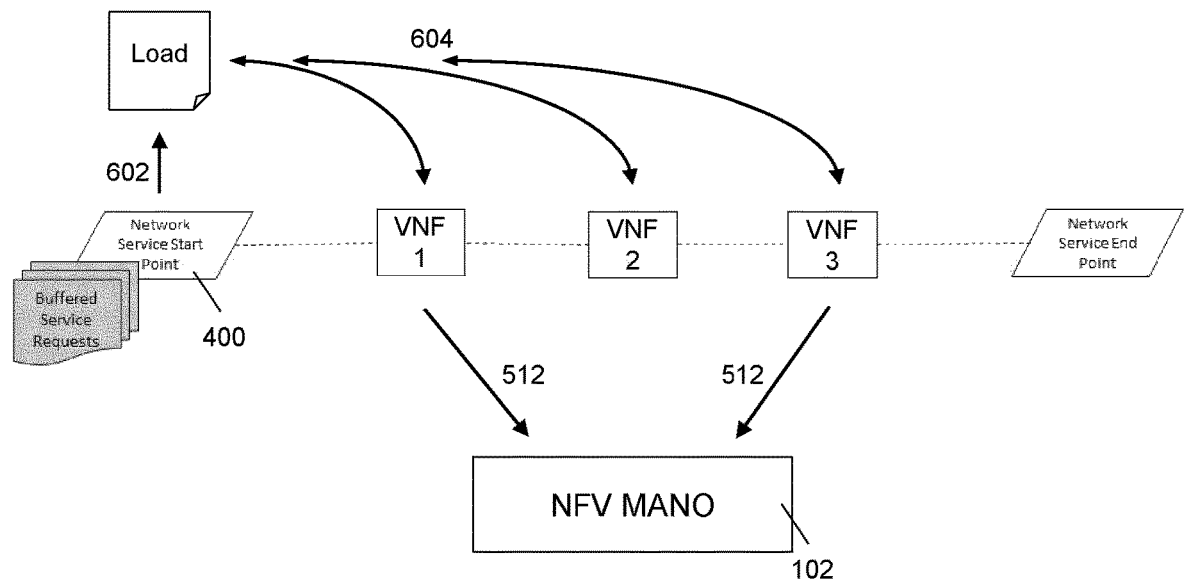
FIG. 6 to FIG. 8 are diagrams illustrating operation of the method for optimising operation of a network service in a virtual network environment managed by a NFV MANO system in a distributed embodiment.

In a first alternative embodiment an individual VNF monitors, 502, load changes on a service chain component located upstream and performs the operations of monitoring, 502, 504, determining, 508 and notifying, 512. In short, in this embodiment a service chain component checks if the impact of the detected upstream processing load change will be significant (i.e. cross a threshold) and notifies the NFV MANO, 102. In this distributed approach a service chain component (i.e. VNF) takes care about itself. In a preferred embodiment each VNF publishes its processing load and updates it whenever there is a noticeable change. The VNFs in the service chain read these published load changes in other VNFs in the service chain. As a result, whenever there is a change in the processing load published by any of the VNFs located upstream in the service chain, the VNFs located downstream determine, 508, the impact the processing load change will have on them. If the processing load at the impacted VNFs is expected to cross a threshold set for a particular one VNF the VNF notifies the NFV MANO, 102. This is schematically illustrated in FIG. 6. The Network Service Start Point, 400, which is also a service chain component that may be implemented as a VNF, publishes, 602, information indicative of its processing load change and the VNF1 to VNF3 read, 604, the information published by the Network Service Start Point, 400. Each one of the VNF1 to VNF3 determines the impact the processing load change will have on the respective VNF. The impact on VNF1 is to be understood as a processing load change expected at the VNF1 and similarly for the remaining service chain components. If the processing load change at the VNF1 to VNF3 is expected to cross thresholds defined for the service chain components VNF1 to VNF3 respectively, then the service chain components for which the threshold is expected to be crossed notify, 512, the NFV MANO, 102. In a preferred embodiment it is the NFVO, 202, inside the NFV MANO system, 102, which is notified, 512, by the service chain components for which the threshold is expected to be crossed. In this way the other VNFs in the service chain will be able to get ready to handle impending service demand before the demand actually reaching them. In the embodiment illustrated in FIG. 6 VNF2 determined that the processing load change at the Network Service Start Point, 400, will not result in crossing a processing load threshold defined for VNF2, whereas both VNF1 and VNF3 determined that their respective processing load thresholds are expected to be crossed. In consequence only VNF1 and VNF3 notified, 512, the NFV MANO system, 102.

Figure 7:
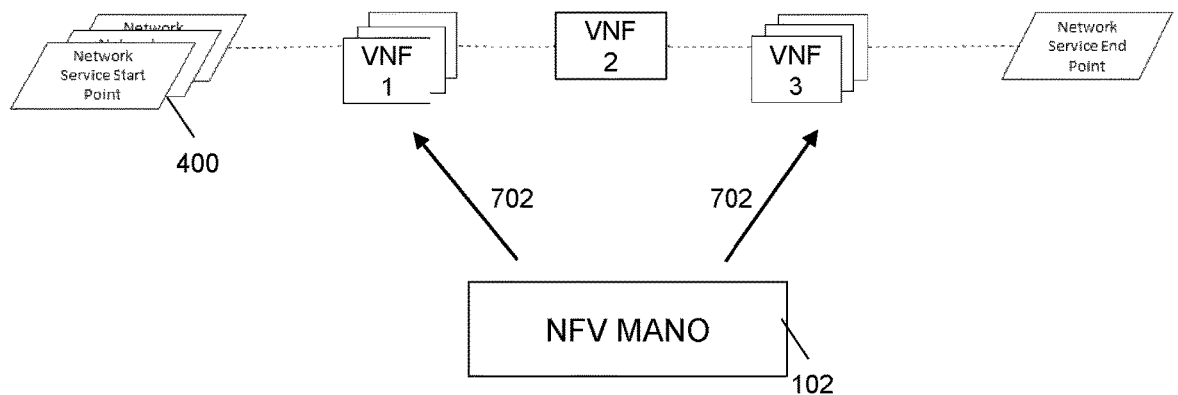

If the processing load change is an increase the NFV MANO system, 102, deploys, 702, additional instances of VNF1 and VNF 3 as illustrated in FIG. 7.

Figure 8:
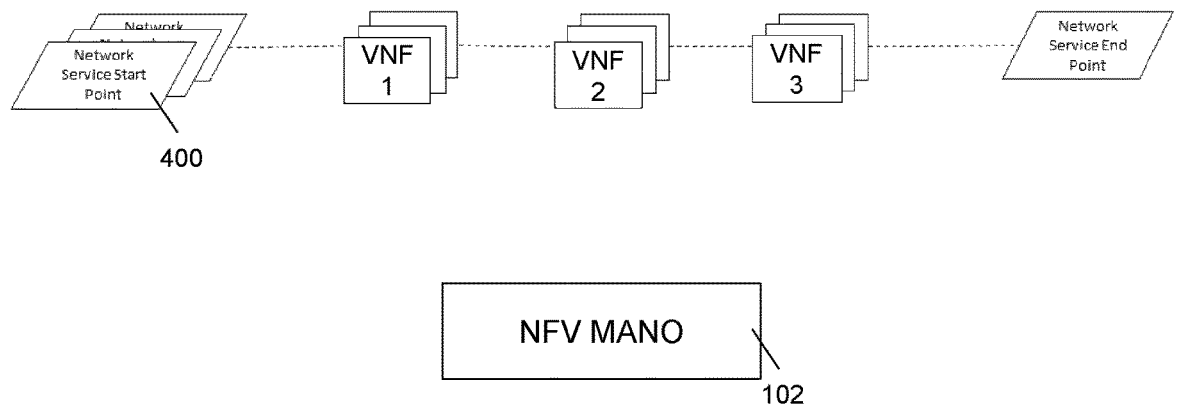

Alternatively, if the processing load change is an increase and all three VNFs, VNF1-VNF3, determine expected crossing of their respective processing load thresholds additional instances of VNF1, VNF2 and VNF 3 are deployed by the NFV MANO system, 102, as illustrated in FIG. 8.

In a preferred embodiment the operation of monitoring, 502, comprises service chain components located downstream in the same service chain as the first service chain component reading announcement indicative of processing load change at the first service chain component. Then, in the operation of determining, 508, the service chain components located downstream in the same service chain as the first service chain component calculate their respective load changes.

In a preferred embodiment reading announcements indicative of a processing load change may be realised by reading reports that have been pushed by service chain components to the other service chain components located downstream in the service chain or, alternatively, by the other service chain components located downstream in the service chain periodically pulling information about processing load from individual service chain components.

In other words, in the distributed embodiment, each component (VNF) in the service chain publishes an interface at which it communicates its own load fluctuations (or indicates in any other way its processing load). Each VNF also listens to changes published at similar interfaces in other VNFs in the same service chain. When a VNF notices load increase (or decrease) in another VNF in the same service chain, it calculates its own expected load increase (or decrease) and informs NFVO, 202, to spawn a new instance of the VNF, preferably, specifying resources required for the new instance. In this way a new VNF instance will be ready to handle upcoming load before the load actually arrives.

Centralised Implementation

Figure 9:
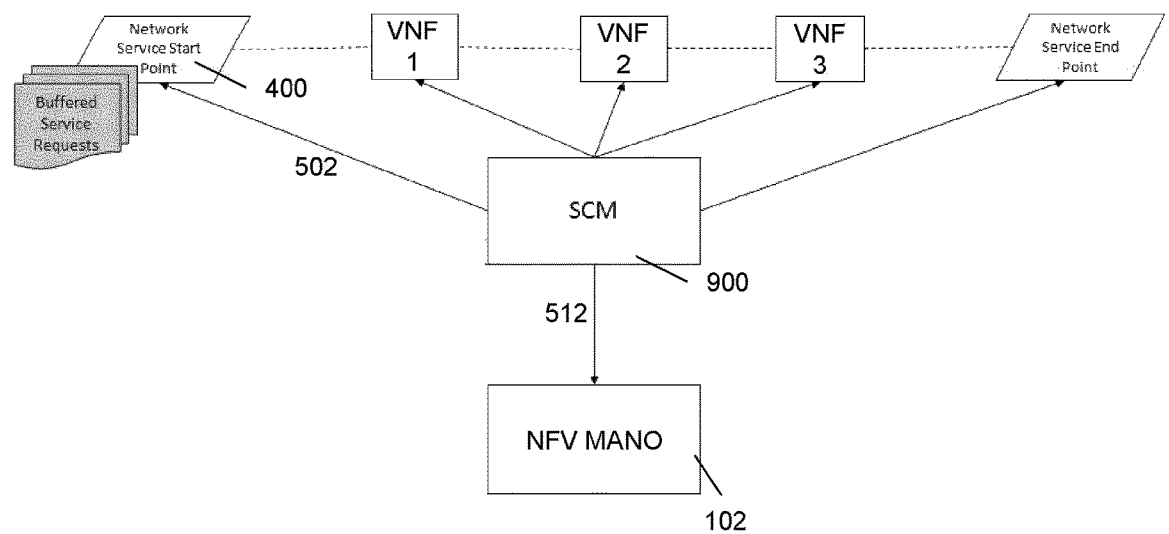
FIG. 9 is a diagram illustrating operation of the method for optimising operation of a network service in a virtual network environment managed by a NFV MANO system in a centralised embodiment.

In a second alternative embodiment, illustrated in FIG. 5 together with FIG. 9, the method is performed by a centralised component, which in this document will be referred to as a Service Chain Manager (SCM), 900. In this embodiment the Service Chain Manager monitors, 502, the load on a first service chain component. Preferably, the SCM, 900, has a view of all service chain components (all VNFs deployed) and can monitor, 502, their processing load change. In consequence the SCM has a view of the whole service chain and it identifies, 506, all service chain components (VNFs) located downstream from the service chain component that experiences load change (i.e. downstream from the first service chain component, 400). In the embodiment illustrated in FIG. 9 the load change manifests itself as an increased level of buffered service requests at the first service chain component, i.e. at the Network Service Start Point, 400. Whenever load change on the first service chain component is detected, the SCM, 900, identifies, 506, other components of the service chain and calculates, 508, impending impact on these other service chain components, VNF1 to VNF3. If it is determined, 510, that processing load at any of the impacted service chain components, VNF1 to VNF3, is expected to be crossed the SCM, 900, informing, 512, the NFV MANO, system 102, about the service chain component where the threshold is expected to be crossed. In a preferred embodiment it is the NFVO, 202, inside the NFV MANO system, 102, which is notified, 512, by the SCM, 900. The NFV MANO system, 102, (or in a preferred embodiment the NFVO, 202) may create new VNF instances along the service chain if the processing load increases and is expected to cross a threshold on at least one service chain component or thresholds on multiple service chain components. Alternatively, when the SCM detects load decrease, for example, an empty buffer at the Network Service Start Point, 400, or one of NFV instances of multiple NFV instances deployed at one service chain component not operating, or multiple instances of NFV at one service chain component operating only at a fraction of their capacity, the SCM may notify, 512, the NFV MANO system, 102, about this processing load decrease and the NFV MANO system, 102, may inactivate VNF instances in the service chain if the decrease of a processing load drops below a threshold.

Also in the centralised implementation, in a preferred embodiment, reading announcements indicative of a processing load change may be realised by reading reports that have been pushed by service chain components to the SCM, 900 or, alternatively, by the SCM, 900, periodically pulling information about processing load from individual service chain components.

Figure 1:
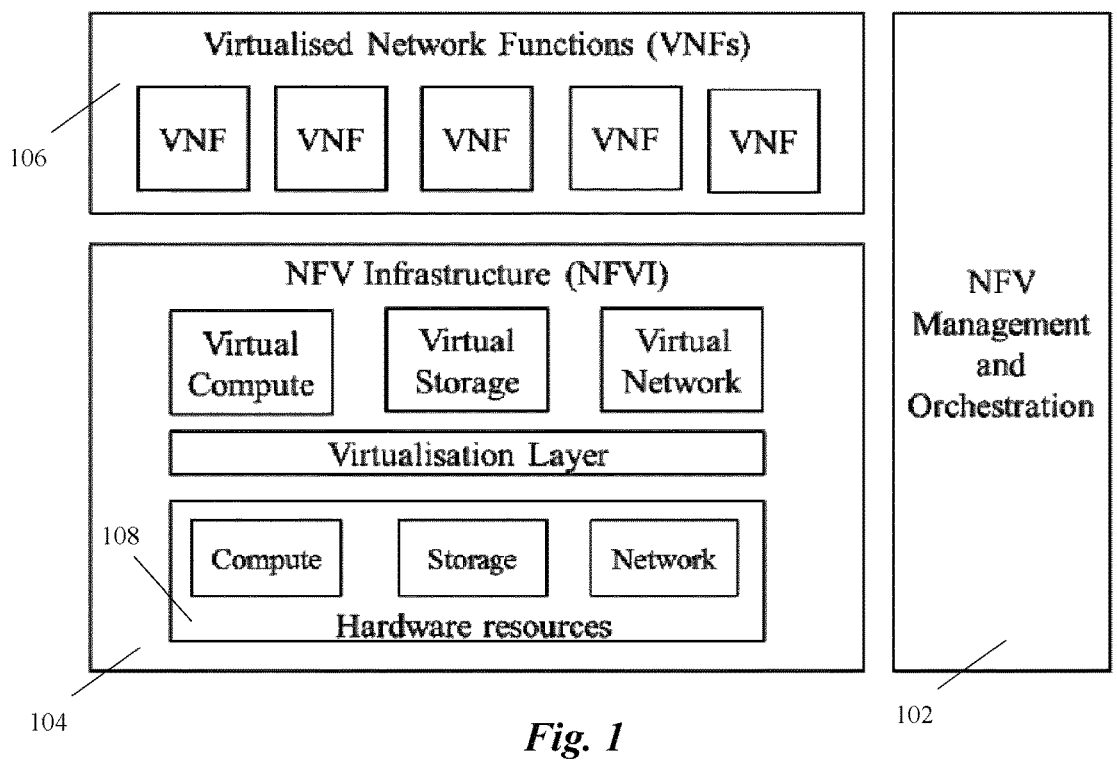
FIG. 1 is a diagram illustrating a high-level NFV framework.
Figure 2:
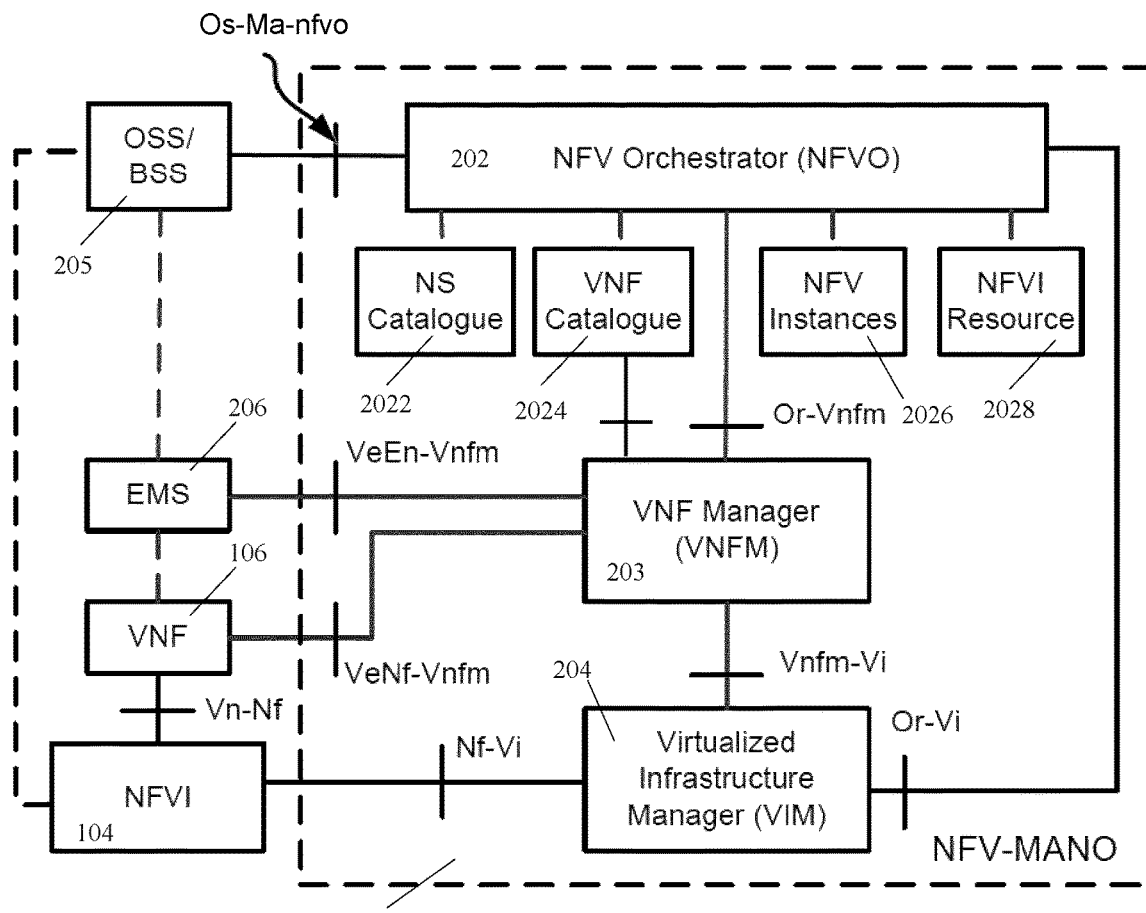
FIG. 2 is a diagram illustrating NFV MANO architectural framework with reference points as defined in the ETSI NFV MANO standard.

In one embodiment the SCM may be implemented as part of OSS system, 205, and the notifications, 512, about the processing load change expected to cross a threshold are sent to the NFV MANO via the Os-Ma-nfvo interface, or more precisely to NFV Orchestrator, NFVO, 202 shown in FIG. 2.

In an alternative embodiment the Service Chain Manager, 900, may be implemented as part of the NFV MANO system, 102, and then the operation of notifying, 512, the NFV MANO will be limited to exchange of information between the SCM, 900, and the NFV Orchestrator, 202.

The comments below are applicable to both distributed and centralised implementations.

Figure 10:
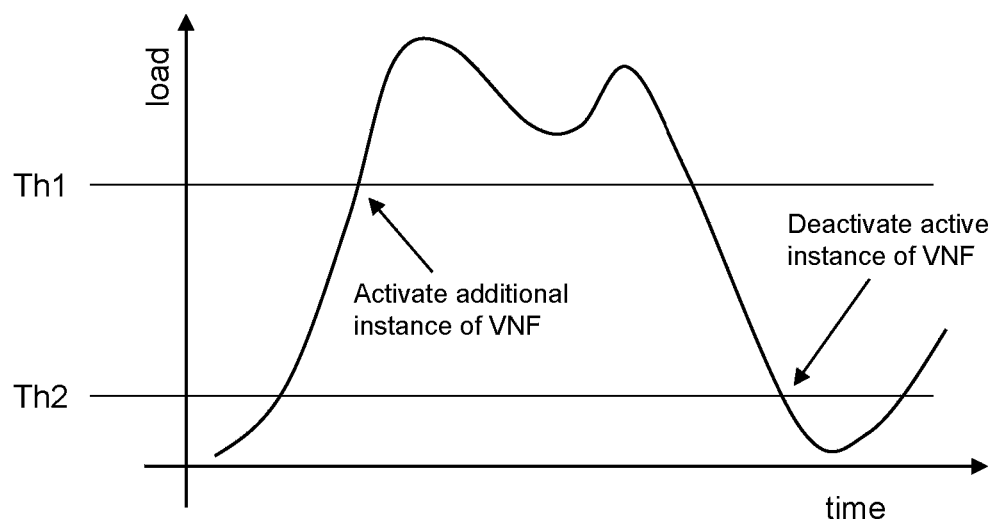
FIG. 10 illustrates thresholds activating VNF scaling operations in one embodiment of the present invention.

In a preferred embodiment there are two processing load thresholds defined for a service chain component as illustrated in FIG. 10. A first threshold, Th1, is used when processing load increases and a second threshold, Th2, is used when processing load decreases. This creates a hysteresis and prevents too frequent activation/deactivation of VNFs. In this embodiment Th1>Th2.

If there is any scale-out restriction in any one of the VNF components or network capacity restriction at any part of the service chain, then the NFV MANO, 102, could also limit scaling out of VNFs and let the excess load to "Fail Early". In other words, in a preferred embodiment of this feature if the operation of notifying, 512, indicates a shortage of processing resources at at least one service chain component the NFV MANO system, 102, may restrict processing capacity of the service chain component upstream in the service chain, preferably at the service chain component at which the processing load change has been first detected. This has the advantage of preventing wasting of resources along the chain in a situation when it is not possible to deliver end-to-end capacity increase. Failing early allows for finding an alternative way to deliver the service rather than waiting for it to fail in the current chain when it hits the bottleneck and only then, with unnecessary delay, start searching for the alternative way to deliver the service.

Depending on embodiment the announcements indicative of a processing load change may be realised either by announcing only processing load delta (i.e. the difference between processing load at time $t_0$ and processing load at time $t_{-1}$) as well as the actual processing load. Alternatively, the information indicative of the processing load may be announced/published as the available spare capacity.

Preferably, the operation of notifying, 512, comprises reporting identification of service chain components with shortage or surplus of processing resources to the NFV MANO system, 102.

The NFV MANO system, 102, and in a preferred embodiment the NFVO, 202, carries out one of VNF scale up, scale down, scale out or scale in operations on the impacted service chain component or components where processing load crossed a threshold. The operations of scaling give the ability to dynamically extend or reduce resources allocated to the Virtualised Network Function as needed. The different types of scaling include scaling up/down and scaling out/in. Scaling Up/Down is the ability to scale by changing allocated resource, e.g. increase/decrease memory, CPU, Central Processing Unit, capacity or storage size whereas scaling Out/In is the ability to scale by add/remove resource instances, e.g. Virtual Machines, (or in other words add/remove instances of the VNF).

The method in its various embodiments discussed above have a number of advantages over solutions known in the art. For example, it allows offering time critical services reliably by advanced preparation to handle upcoming service demand. Resources will be added before load increase reach service chain component or components and performance degradation will be avoided. On the other hand, it helps achieving resource savings during off peak times. Opposite to adding more resources in anticipation of processing load increase it is possible to free resources when it is determined that they will not be needed. In services deployed in accordance with embodiments of this invention it is possible to avoid the need for usual over-provisioning to handle fluctuating service demands, unexpected traffic increase or service element failure.

Another advantage of this solution is that it allows for dynamic optimum resource allocation in response to the upcoming demand while creating new VNF instances. (Resource allocation information is stored in VNF deployment descriptor at design time.)

Figure 11:
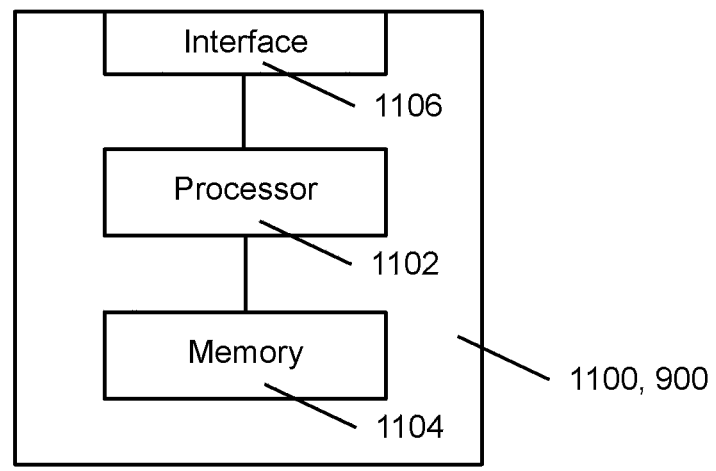
FIG. 11 is a diagram illustrating an embodiment of an apparatus for virtual function self-organisation in operation of a network service in a virtual network environment managed by an NFV MANO, system.

With reference to FIG. 11 an embodiment of an apparatus, 1100, for virtual function self-organisation in operation of a network service in a virtual network environment is now to be described. The virtual network environment is managed by a Network Functions Virtualisation Management and Orchestration, NFV MANO, system, 102. The apparatus, 1100, comprises a processor, 1102, and a memory, 1104. The memory, 1104, contains instructions executable by the processor, 1102, such that the apparatus, 1100, is operative to monitor processing load on a first service chain component. In a preferred embodiment the first service chain component may be a Network Service Start Point, 400, as illustrated, for example in FIG. 6 or FIG. 9. However, in alternative embodiments the first service chain component may be any of the components of the service chain. Also preferably, the first service chain component and the other service chain components are implemented as Virtualised Network Functions, VNFs. In some embodiments, however, the service chain may comprise a mixture of Virtualised Network Functions and network functions implemented as hardware network elements/functions.

If the apparatus, 1100 detects a processing load change at the first service chain component, 400, the apparatus, 1100, is operative to determine impact of the processing load change on a second service chain component located downstream in said service chain. Preferably, the apparatus, 1100, determines the impact by determining (e.g. calculating or estimating) a processing load change at the second service chain component. The processing load change may be increase or decrease depending on how the processing load changes upstream in the service chain.

If the processing load of the second service chain component is expected to cross a threshold the apparatus, 1100, is operative to notify the NFV MANO system, 102, about the impact the processing load change will have on the second service chain component in said service chain. In a preferred embodiment it is the NFVO, 202, which is notified about the impact.

In a preferred embodiment the apparatus, 1100, is operative to run a Virtualised Network Function as a component of a service chain. This embodiment allows for a distributed implementation of the inventive solution. In this embodiment the service chain component takes care about itself.

In a preferred embodiment the apparatus, 1100, is operative to read announcement indicative of processing load change at the first service chain component. Preferably each VNF (service chain component) publishes its processing load and updates it whenever there is a noticeable change. The VNFs in the service chain read these published load changes in other VNFs in the service chain. As a result, whenever there is a change in the processing load published by any of the VNFs located upstream in the service chain, the VNFs located downstream determine, 508, the impact the processing load change will have on them and if the processing load at the impacted VNFs is expected to cross a threshold set for a particular one VNF the VNF notifies the NFV MANO, 102.

In another alternative embodiment the apparatus, 1100, is adapted to operate as a centralised entity. In a preferred embodiment the centralised entity is a Service Chain Manager, 900, discussed above in description of centralised embodiment of the method for virtual functions self-organisation. When the apparatus, 1100, operates as a centralised entity (SCM, 900) it is operative to identify component or components located downstream from the first service chain component in said service chain after detecting a processing load change. Here, rather than service chain components individually taking care about themselves have an apparatus that supports the task of self-organisation of the deployed VNFs in the service chain.

Preferably, the SCM, 900, monitors load on individual service chain components and network capacity of the links between these components in the service chain. Whenever load changes on any component, the SCM, 900, calculates impending impact on all other components and takes appropriate steps, such as informing, NFVO, 202 to create new VNF instances.

In this embodiment, preferably, the apparatus, 1100, is operative to determine impact the processing load change will have on a plurality of service chain components located downstream from the first service chain component at which said processing load change has been detected. The apparatus, 1100, is also operative to report identification of service chain components with shortage or surplus of processing resources to the NFV MANO system (102). Determining the shortage or surplus of processing resources is the outcome of determining the impact in which the apparatus, 1100, calculates or estimates a processing load change at the service chain components located downstream from the first service chain component. As mentioned earlier, the processing load change at the downstream service chain components may be increase or decrease depending on how the processing load changes upstream in the service chain.

Preferably, the apparatus, 1100, is operative to use a first threshold, Th1, when the processing load increases and use a second threshold, Th2, when the processing load decreases wherein the first threshold is greater than the second threshold. An advantage of this embodiment is that it creates a hysteresis and prevents too frequent activation/deactivation of VNFs. This is schematically illustrated in FIG. 10.

The apparatus further comprises (in both centralised and distributed embodiments) an interface, 1106, for connecting to the network and via said network to other elements of the network.

Figure 15:
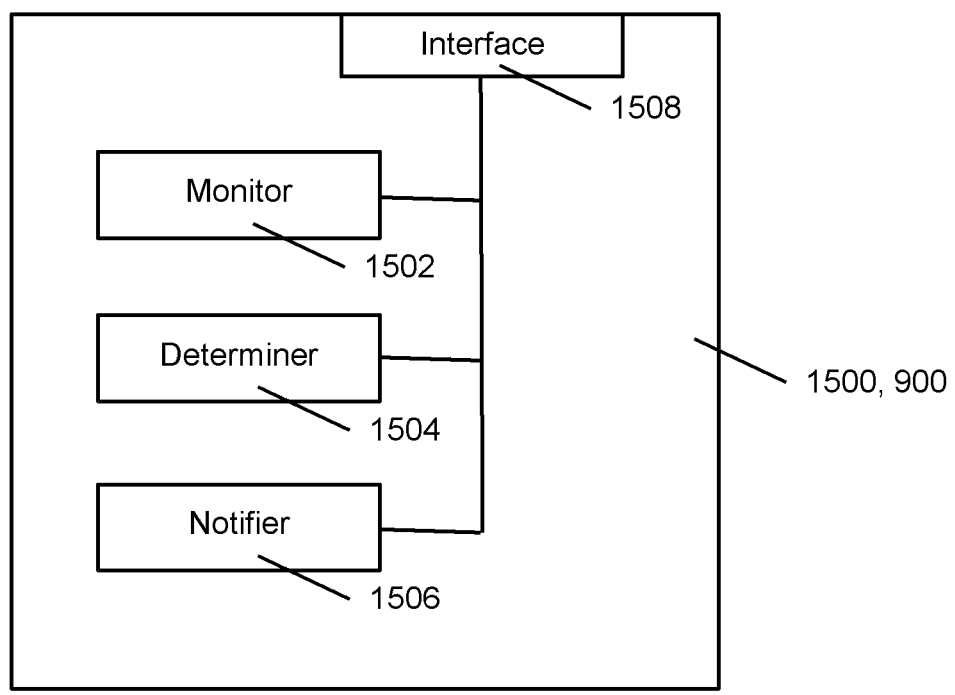
FIG. 15 is a diagram illustrating an embodiment of an apparatus for virtual function self-organisation in operation of a network service in a virtual network environment managed by an NFV MANO, system.

With reference to FIG. 15 an alternative embodiment of an apparatus, 1500, for virtual function self-organisation in operation of a network service in a virtual network environment is now to be described. The virtual network environment is managed by a Network Functions Virtualisation Management and Orchestration, NFV MANO, system, 102.

The apparatus, 1500, comprises a monitor, 1502, for monitoring processing load on a first service chain component, a determiner, 1504. The determiner, 1504, is for determining impact a processing load change on the first service chain component will have on a second service chain component located downstream in said service chain. The apparatus, 1500, further comprises a notifier, 1506, for notifying the NFV MANO system about the impact the processing load change on the first service chain component will have on the second service chain component in said service chain. The notifier, 1506, is configured to send the notification the NFV MANO system if the processing load of the second service chain component is expected to cross a threshold.

If the apparatus 1500 is implemented as a centralised function (e.g. Service Chain Manager) the monitor, 1502, may be configured to read announcements indicative of a processing load change by reading reports that have been pushed by service chain components to the apparatus, 1500. Alternatively, or in addition, the apparatus 1500, may be configured to periodically pull information about processing load from individual service chain components.

Preferably, the determiner, 1504, is configured to identify service chain component or service chain components located downstream from the first service chain component in said service chain. In operation, the determiner, 1504, identifies the downstream components (as likely to be affected by the increased workload upstream in the service chain), after detecting that a processing load changed at the first service chain component.

Preferably, the notifier, 1506, is configured to report identification of service chain components with shortage or surplus of processing resources to the NFV MANO system. Further, in a preferred embodiment the notifier, 1506, is configured to use a first threshold, Th1, when the processing load increases and to use a second threshold, Th2, when the processing load decreases wherein the first threshold is greater than the second threshold.

In one embodiment the apparatus, 1500, is operative to run a Virtualised Network Function as a component of a service chain. This embodiment allows for implementing the method described above in a distributed fashion.

In an alternative embodiment, the apparatus, 1500, is adapted to operate as a centralised entity. This embodiment, in turn, allows for implementing the method described above, with reference to the Service Chain Manager, in a centralised fashion.

The apparatus further comprises (in both centralised and distributed embodiments) an interface, 1508, for connecting to the network and via said network to other elements of the network.

5G RAN Split Architecture

Figure 12:
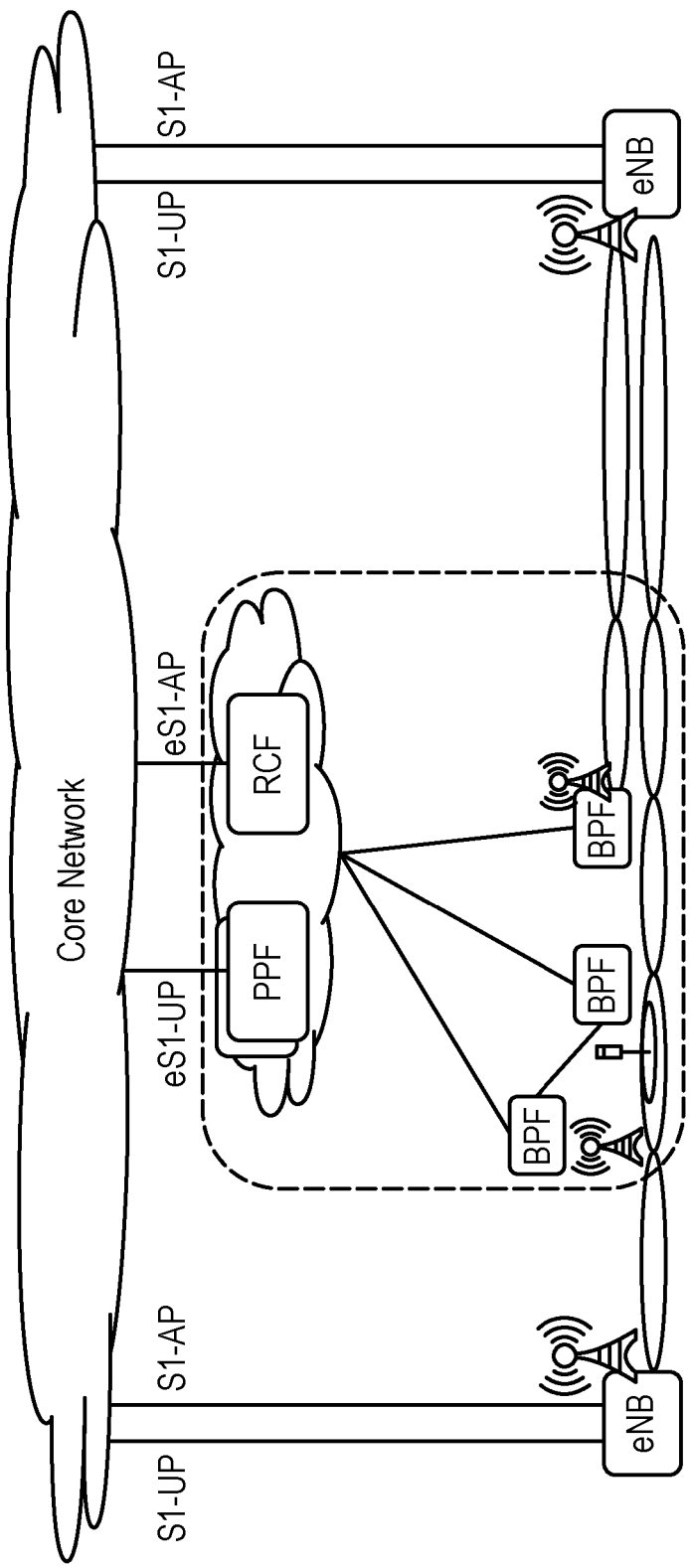
FIG. 12 is a diagram illustrating an example of a 5G RAN Split Architecture.

An example of a possible practical implementation of the invention in one of its embodiment will now be described with reference to 5G RAN Split Architecture illustrated in FIG. 12. The split architecture consists of the eNB functionality being split across three managed elements, two of which (vRC, virtualized Radio Control, and vPP, virtualized Packet Processor) are virtual network functions and will be cloud deployed, while the third one (BPU) remains as a physical function.

Mobile broadband service chain includes BPF, Baseband Processing Function (BPF is implemented as a Physical Network Function which executes on dedicated HW (BPU)), RC, and PP components from RAN Split Architecture, and MME, Mobility Management Entity, from the Core Network. Network functions RC, PP (Packet Processor), and MME operate as VNFs in the cloud infrastructure. This is indicated by letter "v" in front of respective acronyms.

Figure 13:
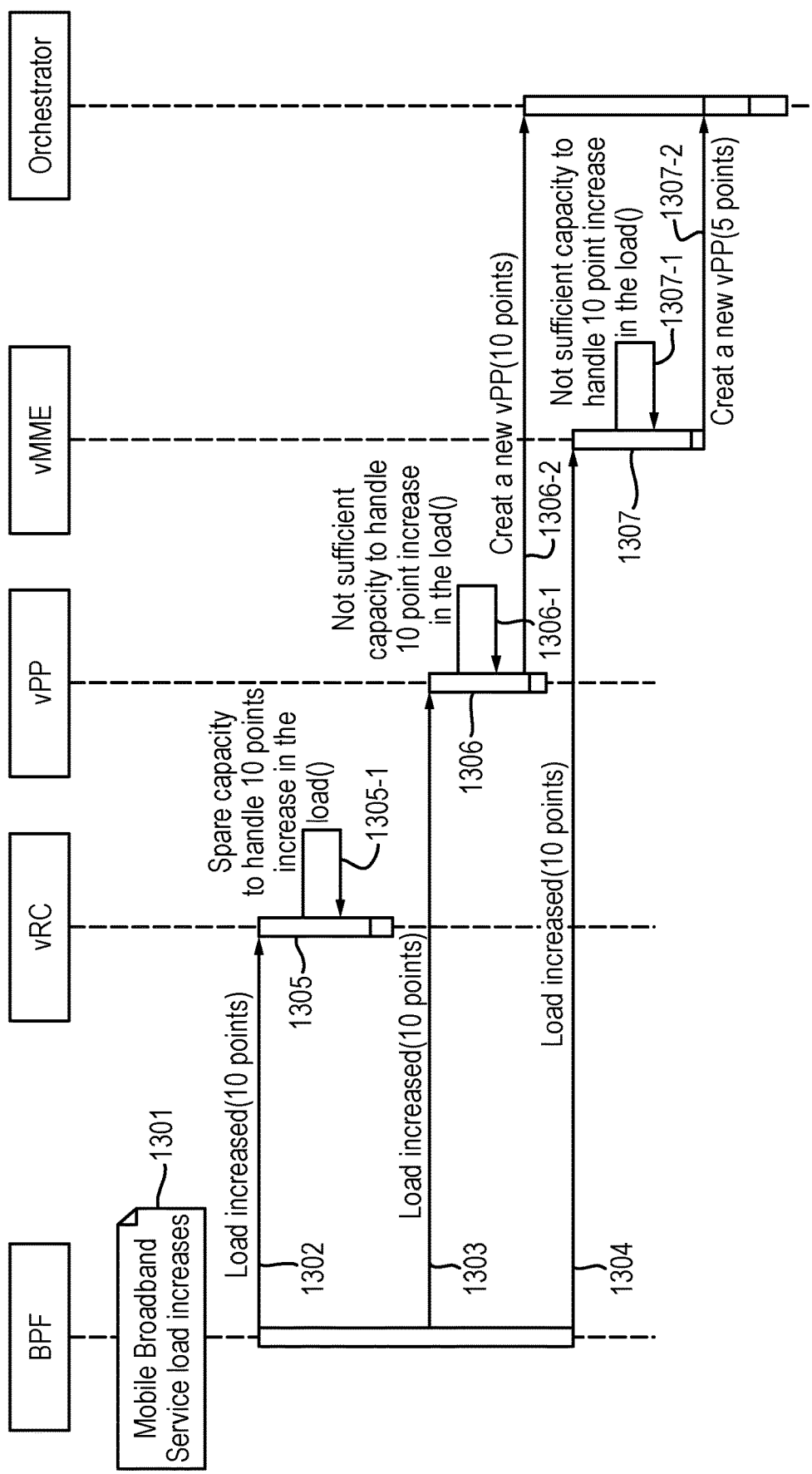
FIG. 13 is a message sequence chart illustrating operation of one embodiment of the method in the 5G RAN Split Architecture of FIG. 12.

User demand for mobile broadband fluctuates significantly and unexpectedly. A sudden increase in the demand for mobile broadband service is considered here, see FIG. 13 for details.

BPF gets a sudden increase for mobile broadband service from users, 1301.

BPF notifies the size of increase in its load to vRC, vPP and vMME, 1302-1304.

vRC calculates its own capacity requirements to handle the notified increased load on BPF, 1305.

vRC realizes that it has spare capacity to handle the increased load, so takes no action, 1305-1.

vPP calculates its own capacity requirements to handle the notified increased load on BPF, 1306.

vPP realizes that it has not sufficient capacity to handle the increased load, 1306-1.

vPP informs the NFVO to create a new vPP instance specifying required resources for the new vPP instance, 1306-2.

vMME calculates its own capacity requirements to handle the notified increased load on BPF, 1307.

vMME realizes that it has some spare capacity but not sufficient to handle the increased load, 1307-1.

vMME informs the NFVO to create a new vMME instance specifying required resources for the new vMME instance, 1307-2.

Event Stream Processor

Another example of a possible practical implementation of the invention in one of its embodiment will now be described with reference to Event Stream Processor.

In the telecom world, User Equipment communicates/interacts with the network regularly in various ways by turning UE ON/OFF, moving from one location to another, establishing/terminating a data session, and informing UE capabilities, call types, call release reasons etc. Capturing these interactions and processing them in real time is of the utmost importance for improving network performance and the quality of service to the customers. This is because insights gained in real time on how UEs are interacting with their network allows operators to configure/organize their networks to suit customer needs.

To facilitate this, it is possible to process and correlate events received from the radio network to create a higher-level record that will provide network operators with an event level insight into how UEs interact with their network. This record could consist of a number of fields based on the events generated in response to the behaviour of UEs in the network. As the UE traverses the network, events are generated based on user actions and localized network characteristics (e.g. congestion).

After capturing these events, network elements send them to the management system in event streams. The management system correlates, and normalizes the information using the additional UE and network data available to it. Then this information is made available for higher processing layers. By using this information, in real time or near real time, operators can determine the performance of individual radio sessions and get the capability to find causes for critical issues that may affect subscribers.

Figure 14:
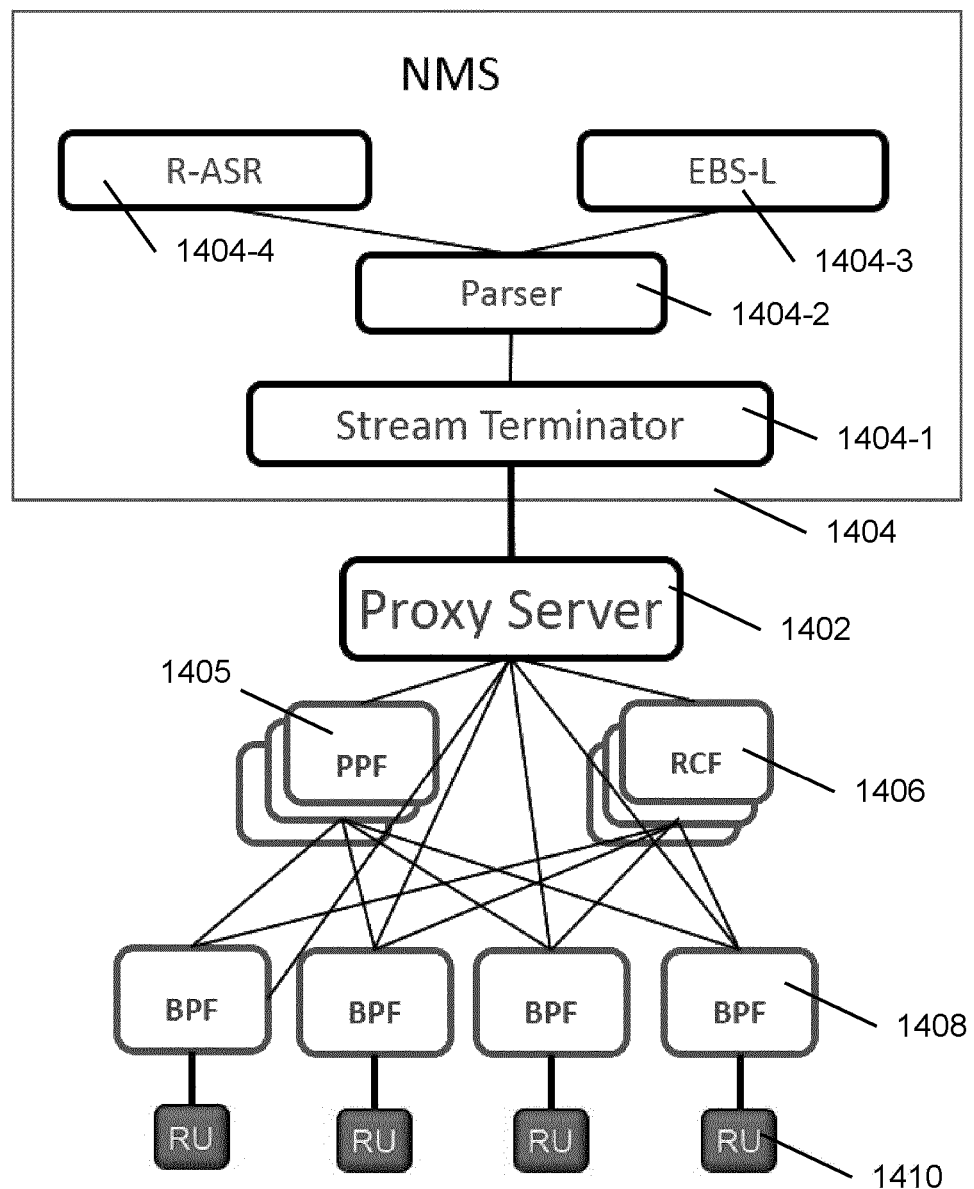
FIG. 14 is a diagram illustrating operation of one embodiment of the method in an event stream processor.

FIG. 14 is an illustration of key components of this solution.

Proxy Server, 1402, is a means to limit the number of externally facing IP addresses in the mediation layer of NMS, Network Management System, 1404. The Proxy Server, 1402, operates as a layer-4 load balancer, and is in effect used to direct network connections to the Stream Terminator, 1404-1, within NMS.

Stream Terminator, 1404-1, receives CellTrace event streams from multiple eNodeB's Event Parser, 1404-2, parses and decodes a subset of the cell trace event types into required format for use by internal northbound applications or to be made available as an NBI (North-bound Interface) for external consumers.

EBS-L, Event Based Statistics-LTE, 1404-3, is a radio network mediation feature that calculates statistics (i.e. PM counters) based on CellTrace event information from the LTE network nodes.

R-ASR (RAN Analytic Session Record also referred to as RAN-ASR), 1404-4, is a radio network mediation feature. It takes real time PM CellTrace event streams as input, and produces a more insightful summary of subscriber sessions as output by using a data reduction mechanism whereby a large number of eNodeB events are ingested to produce a condensed summary. This component is responsible for computing output metrics based on correlated data from events as well as network topology.

In deployment in accordance with the Network Function Virtualization all of the above functions migrate to cloud based infrastructure running as virtual functions. Only exception to this is the BPF which can't be separated from the required physical hardware.

At times, as a result of high user activity in the network, network elements send quantities of information at rates sufficient to exceed the capacity of the management system. It is possible, in the absence of any coping mechanism, that this flood of information exhausts the Network Management System resources, rendering it inoperable. A crude existing strategy to survive these information storms is to efficiently discard sufficient excess data to protect the management system. While this crude discarding may look effective to safeguard the system, it makes the system not usable the very moment it is required the most.

Centralised Embodiment

In Alternative 1, the physical network function BPF and the virtual network functions PPF, Packet Processing Function, 1405, RCF, Radio Control Function, 1406, Stream Terminator, 1404-1, Event Parser, 1404-2, EBS-L, 1404-3, and R-ASR 1404-4, notify changes in their activity level (work load) to NMS/OSS, 1404, whenever there is a change in their activity level. By taking their capacity into consideration the NMS/OSS, 1404, calculates the implication of that change in terms of impending load increase/decrease for Stream Terminator, 1404-1, Event Parser, 1404-2, EBS-L, 1404-3, and R-ASR, 1404-4. Where appropriate, the NMS/OSS, 1404, requests the NFVO, 202, for new virtual instance of Stream Terminator, 1404-1, Event Parser, 1404-2, EBS-L, 1404-3, and R-ASR, 1404-4. As a result, new virtual function instances will be ready to handle increased load by the time the high load reaches the NMS/OSS, 1404. In this embodiment the NMS/OSS, 1404, operates as a Service Chain Manager.

Distributed Embodiment

In Alternative 2, the physical network function BPU, Baseband Processing Unit, and the virtual network functions PPF, 1405, RCF, 1406, Stream Terminator, 1404-1, Event Parser, 1404-2, EBS-L, 1404-3, and R-ASR 1404-4 publish changes in their activity level (work load) whenever there is a change. These changes are constantly monitored by the Stream Terminator, 1404-1, Event Parser, 1404-2, EBS-L, 1404-3, and R-ASR 1404-4. Whenever there is a change in the activity is noticed, implication of that change is determined in terms of impending load increase/decrease by the Stream Terminator, 1404-1, Event Parser, 1404-2, EBS-L, 1404-3, and R-ASR 1404-4. When shortage of resources is detected a requirement for new virtual instance will be communicated to NFVO, 202, by those of Stream Terminator, Event Parser, EBSL and R-ASR which predicted the shortage. As a result, new virtual function instances will be ready to handle increased load by the time the high load reaches the NMS, 1404.

In the centralized and distributed embodiments described above one can distinguish two service chains:

1. EBS-L service chain that presents radio network statistics. This service chain involves physical component BPF, and virtual components PPF, RCF, Proxy Server, Stream Terminator, Parser, EBS-L
2. R-ASR service chain that presents insights about customer sessions. This service chain involves physical component BPF, and virtual components PPF, RCF, Proxy Server, Stream Terminator, Parser, A-RSR.

As described earlier in various embodiments the invention provides an improved method and apparatus for virtual function self-organisation in operation of a network service in a virtual network environment. What needs to be appreciated is that in embodiments of the present invention the VNFCs do not exist in the management system inventory or in the cloud as entities—they are created on demand as they are needed. Secondly, in the embodiments of the present invention the threshold of the entire service chain is taken into account to predict impact of load changes on one part of the chain on VNFs in another part of the chain.

Abbreviations

DF Delivery function
E2E End to End
ETSI European Telecommunications Standards Institute
FB Functional Block
FCAPS Fault Configuration Accounting Performance and Security
FEP Front End Processor
FG Forwarding Graph
HW Hardware
ICEs Intercepting Control Elements
ISG Industry Specification Group
ISP In service Performance
IT Information Technology
KPI Key Performance indicator
LEMF Law Enforcement Monitoring Facilities
NF Network Function
NFV Network Functions Virtualisation
NFVI Network Function Virtualisation Infrastructure
NFV MANO Network Function Virtualisation Management and Orchestration
NFVO Network Functions Virtualisation Orchestrator
NMS Network Management System
NS Network Service
NSD Network Service Descriptor
OS Operating System
OSS/BSS Operations Support System/Business Support System
PI Performance indicator
PNF Physical Network Function
RU Radio Unit
SCM Service Chain Manager
SDN Software Defined Networking
SOD Separation of duty
SW Software
vCPU virtual Central Processing Unit VDU Virtualisation Deployment Unit
VI Virtual Infrastructure
VIM Virtual Infrastructure Manager
VL Virtual Link
VLAN Virtual Local Area Network
VLD Virtual Link Descriptor
VM Virtual Machine
VNF Virtualised Network Function
VNFC Virtualised Network Function Component
VNFCI Virtualised Network Function Component Instance
VNFD Virtualised Network Function Descriptor
VS Virtual Storage

The invention claimed is:

1. A method for virtual function self-organisation in operation of a network service in a virtual network environment managed by a Network Functions Virtualisation Management and Orchestration, NFV MANO, system, the method comprising:
monitoring processing load on a first service chain component in a service chain; and
if a processing load change is detected at the first service chain component, determining an impact of the processing load change on service chain components located downstream from the first service chain component in said service chain, and notifying the NFV MANO system about the impact the processing load change will have on at least one of the service chain components located downstream in said service chain if a processing load of the at least one of the service chain components is expected to cross a threshold;
wherein the impact the processing load change will have on at least one of the service chain components located downstream in said service chain is an expected processing load change at the at least one of the service chain components located downstream in said service chain, and wherein notifying the NFV MANO system about the impact the processing load change will have on at least one of the service chain components located downstream in said service chain comprises notifying the NFV MANO system of the expected processing load change if a processing load of the at least one of the service chain components is expected to cross a threshold as a result of the expected processing load change.

2. The method according to claim 1, wherein monitoring processing load on the first service chain component comprises reading announcements indicative of processing load change at the first service chain component.

3. The method according to claim 1, wherein monitoring processing load on the first service chain component comprises reading, by the service chain components located downstream in the same service chain as the first service chain component, announcements indicative of processing load change at the first service chain component.

4. The method according to claim 3, wherein determining the impact of the processing load change on the service chain components located downstream in said service chain comprises calculating, by the service chain components located downstream in the same service chain as the first service chain component, the respective load changes of those service chain components.

5. The method according to claim 1, further comprising, after detecting a processing load change at the first service chain component, identifying the service chain components located downstream from the first service chain component in said service chain.

6. The method according to claim 1, wherein monitoring processing load on the first service chain component comprises reading, by a centralised Service Chain Manager, announcements indicative of processing load changes at the first service chain component.

7. The method according to claim 6, wherein determining the impact of the processing load change on the service chain components located downstream in said service chain is performed by the centralised Service Chain Manager for service chain components located downstream from the first service chain component at which said processing load change has been detected.

8. The method according to claim 1, wherein notifying the NFV MANO system comprises reporting identification of service chain components with shortage or surplus of processing resources to the NFV MANO system.

9. The method according to claim 1 further comprising the NFV MANO system, in response to the notification, carrying out one of scale up, scale down, scale out or scale in operations on the at least one of the service chain components where processing load is expected to cross a threshold.

10. The method according to claim 1, wherein if the NFV MANO system is notified of a shortage of processing resources at the at least one of the service chain components, the NFV MANO system restricts processing capacity of the first service chain component.

11. The method according to claim 1, further comprising using a first threshold as said threshold when the processing load increases and using a second threshold as said threshold when the processing load decreases, wherein the first threshold is greater than the second threshold.

12. The method according to claim 1, wherein the at least one of the service chain components includes an intermediate service chain component that is neither the first nor the last service chain component in the service chain.

13. An apparatus for virtual function self-organisation in operation of a network service in a virtual network environment managed by a Network Functions Virtualisation Management and Orchestration, NFV MANO, system, the apparatus comprising a processor and a memory, the memory containing instructions executable by the processor such that the apparatus is operative to:
monitor processing load on a first service chain component in a service chain; and
if a processing load change is detected at the first service chain component:
determine an impact of the processing load change on service chain components located downstream from the first service chain component in said service chain; and
notify the NFV MANO system about the impact the processing load change will have on at least one of the service chain components located downstream in said service chain if a processing load of the at least one of the service chain components is expected to cross a threshold;
wherein the impact the processing load change will have on at least one of the service chain components located downstream in said service chain is an expected processing load change at the at least one of the service chain components located downstream in said service chain, and wherein notifying the NFV MANO system about the impact the processing load change will have on at least one of the service chain components located downstream in said service chain comprises notifying the NFV MANO system of the expected processing load change if a processing load of the at least one of the service chain components is expected to cross a threshold as a result of the expected processing load change.

14. The apparatus according to claim 13, further operative to read announcements indicative of processing load change at the first service chain component.

15. The apparatus according to claim 13, further operative to identify the service chain components located downstream from the first service chain component in said service chain after detecting a processing load change at the first service chain component.

16. The apparatus according to claim 13, further operative to report identification of service chain components with shortage or surplus of processing resources to the NFV MANO system.

17. The apparatus according to claim 13, further operative to use a first threshold as said threshold when the processing load increases and use a second threshold as said threshold when the processing load decreases wherein the first threshold is greater than the second threshold.

18. The apparatus according to claim 13, further operative to run a Virtualised Network Function as a component of a service chain.

19. The apparatus according to claim 13, configured to operate as a centralised entity.

* * * * *